Feb. 7, 1933.　　　　　E. E. FOSTER　　　　　1,896,577
HYDRAULIC CHANGE SPEED TRANSMISSION FOR MOTOR VEHICLES
Filed July 26, 1930　　　4 Sheets-Sheet 1

WITNESS

INVENTOR
Edwin Earl Foster
BY
ATTORNEY

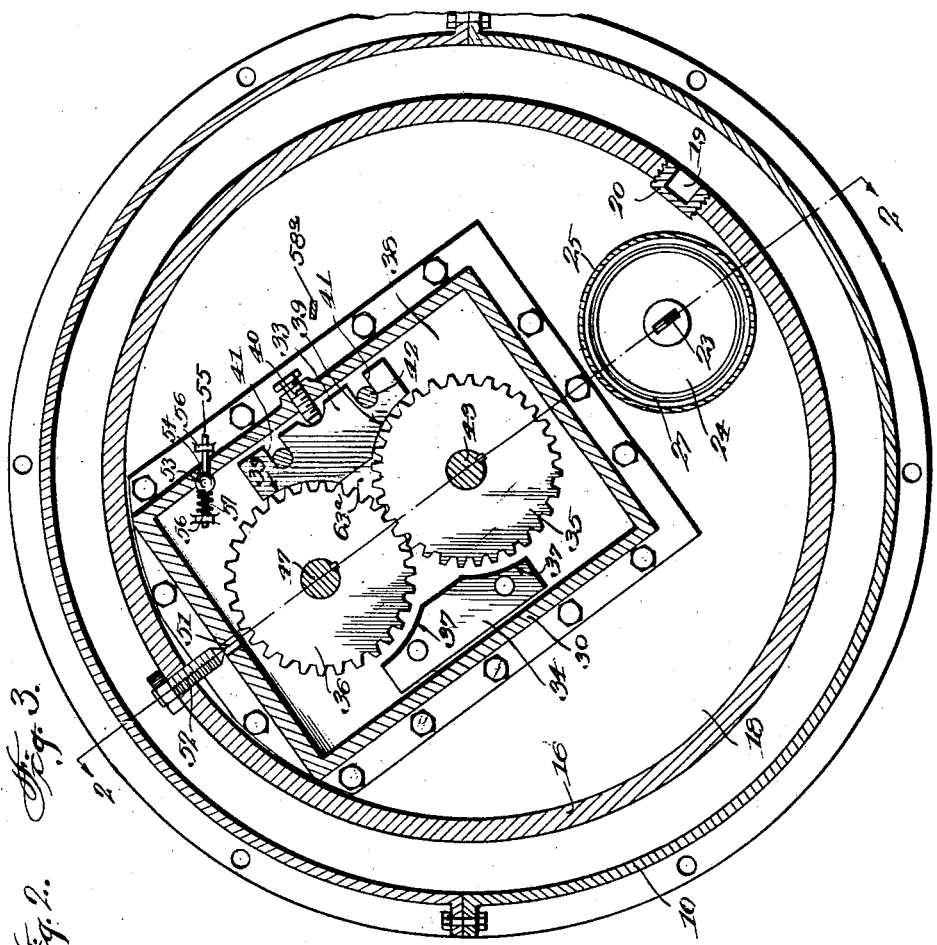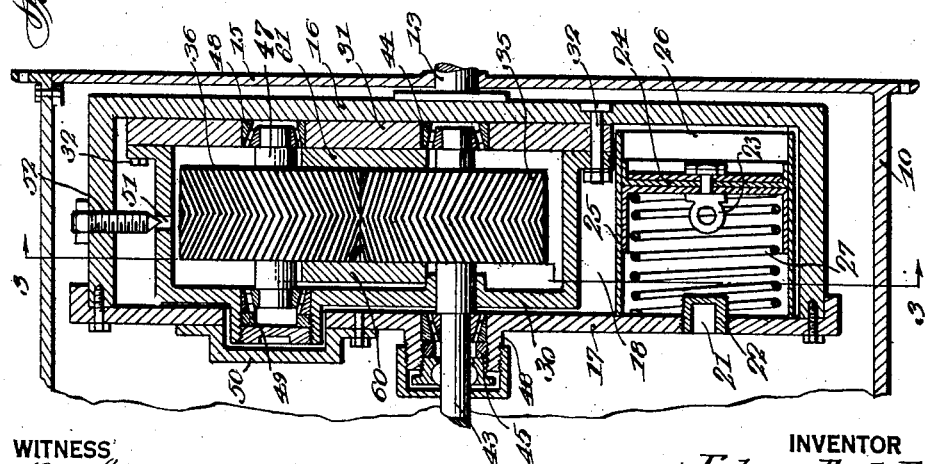

Feb. 7, 1933.  E. E. FOSTER  1,896,577
HYDRAULIC CHANGE SPEED TRANSMISSION FOR MOTOR VEHICLES
Filed July 26, 1930  4 Sheets-Sheet 3
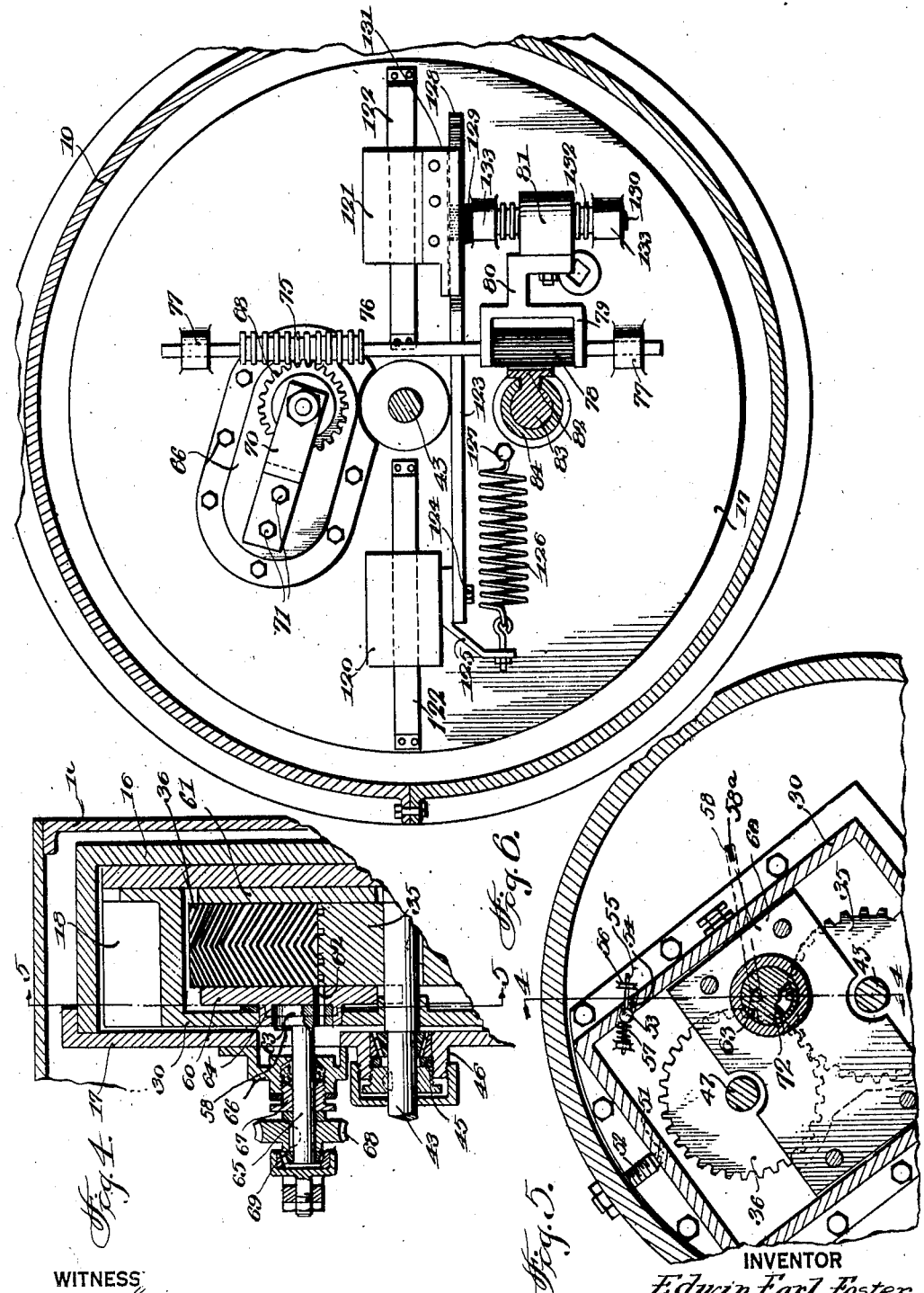
WITNESS
INVENTOR
Edwin Earl Foster
BY
ATTORNEY

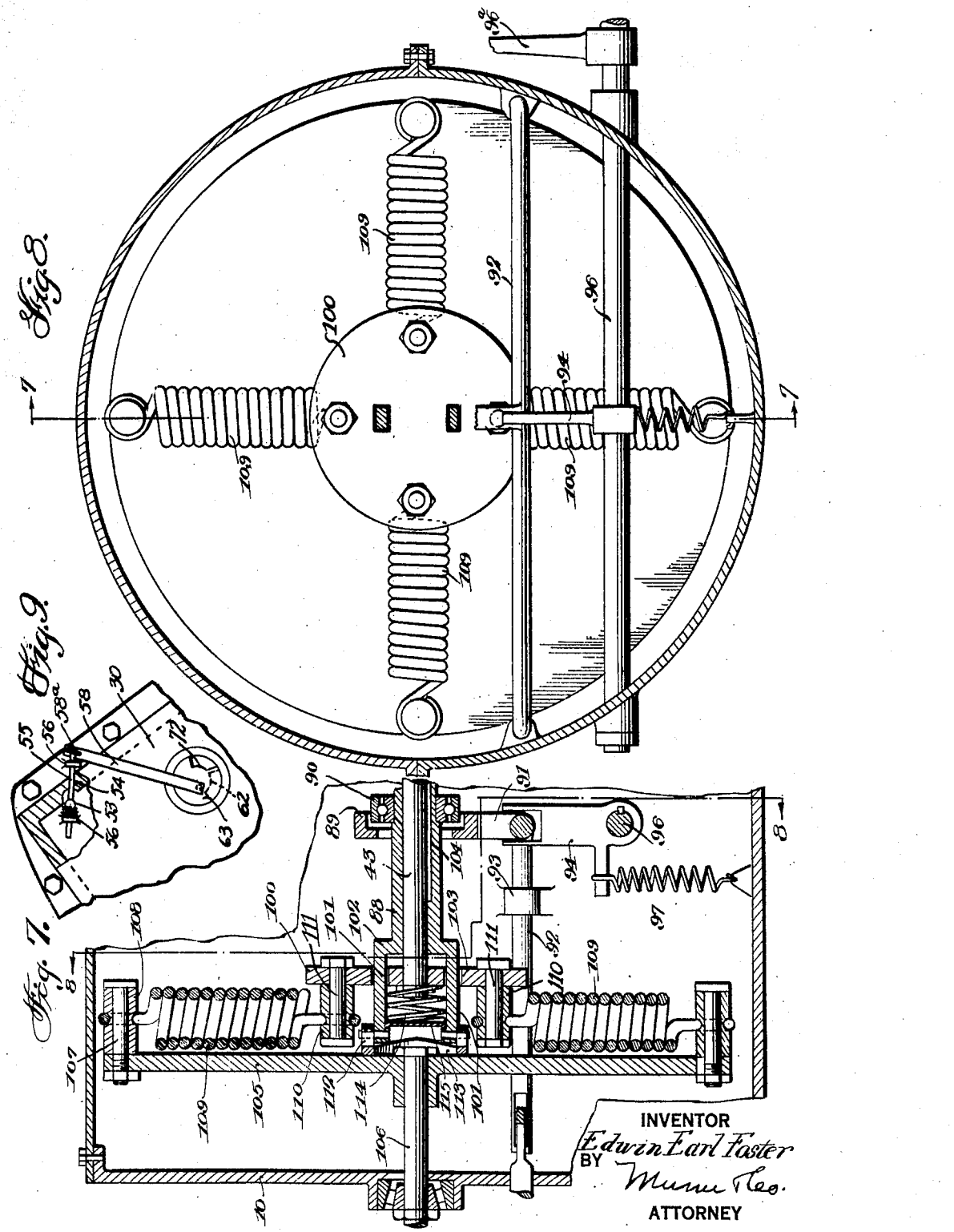

Patented Feb. 7, 1933

1,896,577

UNITED STATES PATENT OFFICE

EDWIN E. FOSTER, OF AUSTIN, TEXAS

HYDRAULIC CHANGE SPEED TRANSMISSION FOR MOTOR VEHICLES

Application filed July 26, 1930. Serial No. 470,963.

This invention relates to an automatic change speed transmission for motor vehicles.

An object of the invention is the provision of a transmission for vehicles of the hydraulic type which will give an infinite number of speed ratios between the driving and driven parts, a shifting lever being employed to obtain the forward speeds, the reverse speed and the neutral position of the transmission, the shifting lever requiring only a forward, a reverse or intermediate position to obtain all the speeds desired for the vehicle, the various changes in the forward speeds being effected automatically, and in a silent manner.

A further object of the invention is the provision of a hydraulic type transmission for automobiles in which an infinite number of speeds are obtained, a torque meter being employed for correspondingly lowering the speed ratio upon an increase in the torque on the drive shaft.

A still further object of the invention is the provision of a hydraulic type transmission which will automatically produce a plurality of forward speeds in which a governor is employed for maintaining a predetermined speed ratio between the fly wheel of the motor and the drive shaft of the automobile.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 2 is a section taken along the line 2—2 of Figure 3,

Figure 3 is a vertical section taken on the line 3—3 of Figure 2,

Figure 1:
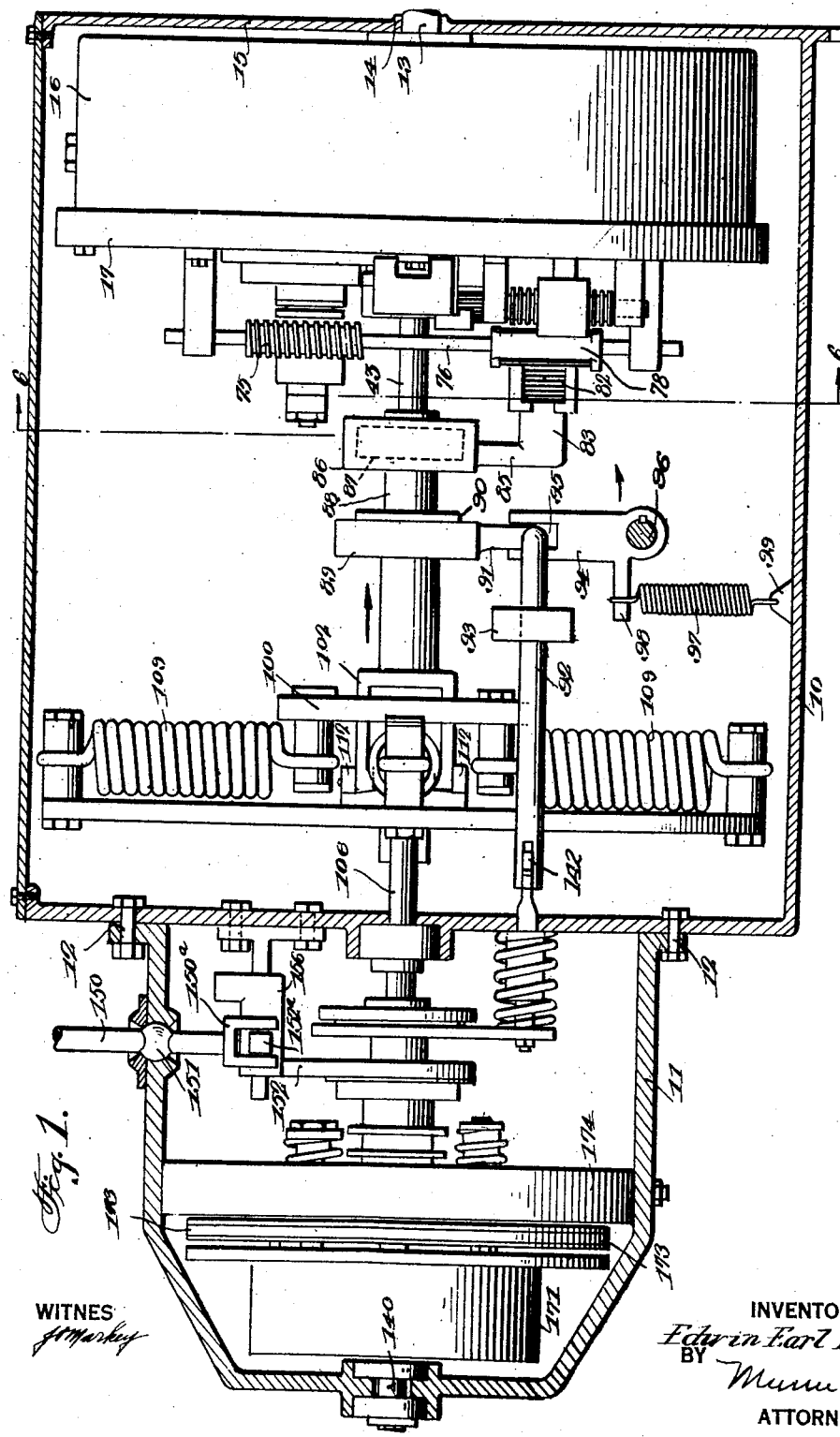
Figure 1 is a longitudinal view of the transmission constructed in accordance with the principles of my invention with the transmission casing in section.

Figure 4 is a fragmentary vertical section taken along the line 4—4 of Figure 5, Figure 5 is a transverse vertical section taken along the line 5—5 of Figure 4, Figure 6 is a transverse vertical section taken along the line 6—6 of Figure 1, Figure 7 is a longitudinal fragmentary vertical section taken along the line 7—7 of Figure 8, Figure 8 is a transverse vertical section taken along the line 8—8 of Figure 7, Figure 9 is a fragmentary view in elevation, partly in section, showing check valve 53 moved to open position.

Referring more particularly to the drawings, 10 designates a transmission casing which may be of any suitable shape for the purpose. An auxiliary casing 11 is connected at 12 to one end of the main casing 10. These casings are supported on the chassis of the automobile in any approved manner.

One end of a crank shaft 13 is mounted in a bearing 14 at one end 15 of the casing 10. This shaft extends through the casing and is rigidly connected with a housing 16 forming with the cover 17 a chamber 18 which is completely filled with a liquid such as glycerine or oil of any suitable character. The housing 16 is provided with an opening 19 normally closed by a plug 20 whereby a liquid may be poured into the chamber 18.

The closure 17 is provided with an opening 21 which is normally closed by a threaded plug 22 for the purpose of inserting a tool to engage an eye 23 secured to a piston 24 which is mounted for reciprocation within a cylinder 25 secured to the cover plate 17. The inner end of the cylinder, as shown at 26, is open to the chamber 18. A spring 27 engages the inner face of the cover 17 and one face of the piston 24 for forcing the piston outwardly of the cylinder 25 so that when the chamber is filled with a liquid and the piston 24 is released it will exert a pressure on the liquid in the chamber 18 for a purpose which will be presently explained.

An auxiliary housing 30 is located within the chamber 18 and is secured to a cover plate 31 which in turn is connected by means of bolts 32 to the housing 16 so that the housing 16 and the auxiliary housing 30 will be revolved by the crank shaft 13.

A pair of end plates 33 and 34 are mounted within the housing 30 and are in close association with a pair of intermeshing herringbone gears 35 and 36. The plate 34 has its inner edge cut away along the curve of an arc as shown at 37, to conform to the curvature of the peripheries of the gears 35 and 36. However, the gears are spaced from the curved portion 37 of the plate 34 in order to permit a liquid in a chamber 38 to pass around portions of the peripheries of these gears and adjacent the curved portions. The plate 33 likewise has curved cut-out portions 39 conforming to the curvature of the gears 35 and 36 with the peripheries of the gears in close association with the cut-out portions. This plate is adjustably positioned by means of a set screw 40 threaded into one wall of the housing 30. The plate 33 is provided with slots 41 adapted to receive pins 42 secured to walls of the housing 30.

The gear 35 is keyed to a shaft 43 which is mounted in a bearing 44 formed in the cover plate 31 of the housing 30 and in a bearing 45 carried by a boss 46 formed on the cover plate 17 of the housing 16. Said shaft extends beyond the bearing 45 for a purpose which will be presently explained. A shaft 47 is keyed to the gear 36 and is mounted in bearings 48 and 49 carried respectively by the cover plate 31 and the wall of the housing 30. A cap 50 embraces the bearing 49 and is secured to the plate 17.

One end of the casing 30 is provided with a restricted passage 51 which permits escape of the liquid from the chamber 38 of the housing 30 to the chamber 18 in the housing 16. A valve 52 has its stem threaded into a passage in the housing 16 and is adapted to control the flow of liquid from the housing 30 to the housing 16.

A check valve 53 controls a passage 54 between the housings 30 and 16. This valve is carried by a stem 55 slidably mounted in guides 56. A spring 57 maintains the valve in a closed position. A lever 58 is adapted to actuate the stem 55 and remove the valve 53 from the passage 54 to permit fluid from the chamber 18 to enter the chamber 38 of the housing 30. This lever 58 has one end secured to a valve 63 and an arm 58ª projects from the free end of the lever and is adapted to engage the projecting end of the valve stem 55 for moving the valve 53 from the seat.

A pair of side plates 60 and 61 embrace the opposite faces of the gears 35 and 36 adjacent where they intermesh. The plate 60 is provided with a passage 62 which leads into a space 63ª formed by portions of the peripheries of the gears 35 and 36 and the inner end of the end plate 33. A valve 63 is mounted for rotation in a box 64 formed on the outer face of the plate 60 and within a passage in the housing 30. A shaft 65 is rigid with the valve and carried by a plate 66 having a packing gland 67 embracing the shaft and threaded into a boss in the plate 66 which is removably secured to the cover plate 17 of the housing 16. A gear 68 is secured to the shaft 65. A thrust bearing 69 carried by a spring member 70 secured at 71 to the cover plate 66 engages the outer end of the shaft 65 for maintaining it in position.

The valve 63 is provided with a passage 72 adapted to align with the passage 62 for permitting oil under pressure from the chamber 18 to be conducted to the chamber 63ª for supplying the teeth of the gears 35 and 36 with a liquid when said teeth enter the chamber 63ª.

The gear 68 meshes with a worm 75 formed integrally with a shaft 76 slidably mounted in bearings 77 secured to the cover plate 17. An elongated gear 78 is rigid with the shaft 76 and is embraced by a yoke 79 carried by an arm 80 which is secured to a nut 81.

A rack 82, secured to a rod 83, meshes with the elongated gear 78 and the rod in turn is slidably mounted in bearings 84. The rod 83 is connected with an arm 85 which in turn is secured or integrally formed with a collar 86. This collar carries a bearing 87 which is rotatably mounted on a sleeve 88 but is connected with the sleeve in order to be shifted when the sleeve is reciprocated.

A second collar 89 is mounted on a bearing 90 which is secured to the sleeve 88 so that the bearing will rotate within the collar while the collar may be moved into engagement with the bearing for moving the sleeve in the direction indicated by the arrow in Figure 1. An arm 91 connected to the collar 89 extends downwardly but in turn is connected to a rectangularly shaped frame 92 slidably mounted in bearings 93 carried by the side walls of the housing 10. A lever 94 is provided with a yoke 95 to receive one end of the frame 92 while the other end of the lever is keyed to a rock shaft 96 connected with the clutch pedal of the vehicle. A spring 97 connected to a lug 98 of the lever 94 and to a lug 99 formed on the housing 10 maintains the lever 94 in a substantially vertical position. Whenever the lever 94 is rocked in the direction indicated by the arrow in Fig. 1 the collar 89 will engage the bearing 90 and shift the sleeve 88 in the direction indicated by the arrow in Figure 1 so that the collar 86 and the rack 82 will be shifted in the same direction, thereby rotating the gear 78, shaft 76, worm 75 and worm wheel 68 causing closing of the port or passage 62 in the plate 60 by the valve 63 and thereby preventing liquid from the chamber 18 from entering the restricted passage 63ª in the housing 30.

Referring more particularly to Figs. 1, 7 and 8, it will be noted that a torque meter is employed for controlling closing or opening of the valve 63 when the strain on the motor, due to lack of momentum of the vehicle, becomes sufficiently great to cause the motor to labor. At this time the torque meter causes closing of the valve 63 to provide for a reduction of the speed.

The torque meter consists of a small disc 100 which is connected to the sleeve 88 by means of arms 101 of a yoke 102 passing through slots 103 in the disc 100, the shaft 43 being slidably keyed, as shown at 104, to the sleeve 88.

A disc 105 which is of considerably greater diameter than the disc 100 is spaced from the last-mentioned disc and is secured to a shaft 106. Pins 107 are secured to the disc 105 spaced 90° apart and carry sleeves 108. Coil springs 109 have their inner ends connected with sleeves 110 mounted on pins 111 carried by the disc 100. It will be seen by this construction that the shaft 106 is driven through the shaft 43 by means of the torsion springs 109 and the discs 100 and 105.

The inner free ends of the arms 101 of the yoke 102 are provided with rollers 112 which are adapted to engage a cam member 113 secured to one face of the disc 105 so that when the disc 100 is revolved relative to the disc 105 the rollers 112 will ride over the cam member and force the sleeve to the right as seen in Figure 7. When the collar 86 and the rack 83 are shifted the shaft 76 is actuated which causes the worm 75 to operate the gear 68 whereby the valve 63 closes the passage 62 to prevent oil from the chamber 18 entering the restricted chamber 63ª and thereby the speed of the vehicle is reduced. The torque meter comes into play when the vehicle is moving down a grade and the torque meter selects a higher speed ratio. The small coil spring 114 tends to keep the cam rollers 112 in engagement with the cam track 113 and has one end in engagement with the disc 100 while the other end engages a plate 115 carried by the arms 101 of the yoke 102. The rollers 112, however, are moved away from the track 113 when the clutch pedal 96ª (Fig. 8) is forced all the way in.

In connection with the manual control of the valve 63 and the control of the valve by the torque meter it is necessary to employ a governor on the flywheel which is constituted by the housing 16 to aid in controlling the valve when the following problem is considered. When the transmission is operated at a ratio of 10 to 1; that is, the flywheel is turning ten revolutions in a certain interval of time while the drive shaft is making one revolution during the same period of time. It will be noted there is a lag of nine revolutions in that same period of time between the drive shaft and the crank shaft or flywheel. Now if the motor is speeded to twenty revolutions per minute the lag will remain the same, giving a ratio of 20 to 11 instead of 20 to 2. The governor is, therefore, employed to cut down this ratio to maintain it uniform at a different speed of the vehicle. The governor also provides for a greater load to be carried by the motor at certain speeds.

As shown more particularly in Figure 6, the governor consists of a pair of weights 120 and 121 which are slidably mounted on guides 122 carried by the plate 17 of the housing 16. A rod 123 is secured at 124 to the weight 120 and an arm 125 projecting from said weight is connected by a spring 126 to a pin or lug 127 secured to the cover plate 17 for aiding in returning the weights towards the center of the flywheel when the speed of the flywheel has decreased sufficiently.

The rod or bar 123 is provided with a rack 128 in mesh with a gear 129 on the shaft 130. The weight 121 has an extension 131 provided with a rack also in mesh with the gear 129. The shaft has a worm 132 which is located between bearings 133 for the shaft 130 and the nut 81 carrying the arm 80 and the yoke 79 is likewise located between certain bearings, the worm 132 being threaded into the nut 81.

The operation of the governor controlling the valve 63 is as follows: When the weights 120 and 121 are moved outwardly from the center of the flywheel, or outwardly from the shaft 43, which is located at the axis of the flywheel, the spring 126 will be placed under a tension and the racks 131 and 128 will rotate the gear 129, causing the worm 132 to thread through the nut 81, thereby giving to the nut a reciprocating movement. This movement is transmitted to the yoke 79 and likewise to the shaft 76 so that as the worm 75 is reciprocated it will cause rotation of the gear 68 and thereby control the opening or closing of the port 62 through the rotation of the valve 63. This control of the valve 63 through the gear 68 may be effected in conjunction with the torque meter or independently of said meter and this control of the valve may be further effected by the governor independently of the manual actuation of the valve.

The elements previously described relate to forward speeds only. The reverse speeds are accomplished through a series of gears enclosed by a housing 171 and acting on shaft 140 as shown in Fig. 1.

A shifting lever 150 universally mounted at 151 in the top of the auxiliary casing 11, has its inner end provided with a yoke 150ª engaging a pin 152ª on a collar 156. An extension 152 on the collar 156 causes reciprocation of the sleeve 155 for aiding in actuating the brake 173 for controlling the gears in the housing 171. Since the reversing mechanism forms no part of the present invention further details appear to be unnecessary.

I claim:

1. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, and means for actuating the valve at will.

2. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, and a clutch pedal connected with the valve for closing the valve when said pedal is manually actuated.

3. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing, including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, and a governor having connections with the valve and tending to close the valve for aiding in maintaining a predetermined speed ratio between the revolving main housing and the driven shaft.

4. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, means for actuating the valve at will, the main housing acting as a fly wheel, a governor carried by the main housing and connected with the valve for causing closing of the valve to maintain a predetermined speed ratio between the driven shaft and the main housing.

5. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, means for actuating the valve at will, a second driven shaft, a resilient connection between said shaft and the first driven shaft, whereby the two shafts will at times have movements relative to each other, and means actuated by the resilient connection and connected with the valve for moving the valve towards closed position when the torque on the crank shaft increases.

6. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, and a plurality of means for actuating the valve, each of the actuating means operating the valve independently of the other actuating means.

7. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, means for actuating the valve at will, means in the main housing for maintaining the liquid in said housing under pressure, a relief valve between the main housing and the auxiliary housing, and means for opening the relief valve when the first-mentioned valve is closed.

8. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, means for actuating the valve at will, a relief valve between the main housing and the auxiliary housing and means connecting the relief valve with the first valve for opening the relief valve when the first valve is actuated.

9. A transmission for vehicles comprising a main housing, a crank shaft revolving said housing, an auxiliary housing in the main housing, a liquid under pressure filling the main housing, the auxiliary housing having an inlet passage connecting said housing with the main housing, a valve normally open for controlling said passage, the auxiliary housing having a restricted outlet passage, a pump in the auxiliary housing including a plurality of intermeshing gears, a driven shaft connected with a gear of said pump, the opening of the valve permitting liquid to flow to the pump and preventing rotation of one of the gears so that the other gear and driven shaft are revolved when the main housing is rotated, means for actuating the valve at will, a second driven shaft, a resilient connection between said shaft and the first driven shaft, whereby the two shafts will at times have movements relative to each other, means actuated by the resilient connection and connected with the valve for moving the valve towards closed position when the torque on the drive shaft increases, and means between the resilient connection and the manual means to provide for the manual actuation of the valve independently of the actuation by the resilient connection.

EDWIN E. FOSTER.